Dec. 26, 1933.  G. JOHNSON  1,941,175
NUT AND NUT INSTALLATION
Filed Jan. 5, 1931
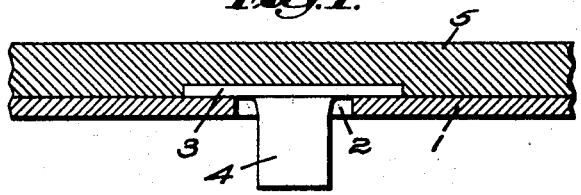
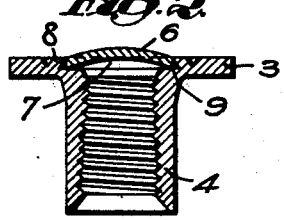
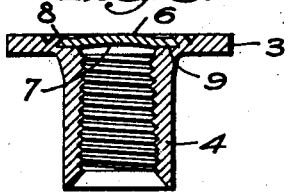
Inventor:
Gustav Johnson
by Emery, Booth, Varney & Townsend
Attys Patented Dec. 26, 1933

1,941,175

UNITED STATES PATENT OFFICE 1,941,175

NUT AND NUT INSTALLATION

Gustav Johnson, West Roxbury, Mass., assignor to United-Carr Fastener Corporation, Cambridge, Mass., a corporation of Massachusetts Application January 5, 1931. Serial No. 506,542

5 Claims. (Cl. 85—1)

My invention aims to provide improvements in nuts and nut installations.

In the drawing which illustrates a preferred embodiment of my invention:—

Figure 1 is a section through a running board structure showing my improved nut in elevation as it appears when attached;

Fig. 2 is a vertical section through the nut and closure plate before the closure plate has been flattened and attached to the nut by lateral expansion; and Fig. 3 is a section similar to Fig. 2 but showing the closure plate expanded and secured to the nut.

My invention, as illustrated by the drawing, is particularly useful in connection with nut installations, wherein a nut having a threaded bore, and normally open at both ends of the bore, is attached to a structure in such a manner that one end is embedded therein. There are a number of important uses for my improved nut unit which has one end of the bore closed by a closure element but I have selected for illustration by the drawing a use which will give a clear understanding of the value of my invention. In Figure 1 I have shown portions of a conventional running board structure as used by many motor vehicle manufacturers.

The particular structure selected for illustration comprises a sheet metal member 1 having an aperture 2, a sheet metal nut having a flange 3 resting against the upper side of the member 1 and a hollow internally threaded portion 4 extending from the flange 3 through the aperture 2. The nut may be rigidly attached to the member 1 as by spot welding the flange 3 thereto or the attachment may be made in any other suitable manner. When the nuts are attached I apply to the upper side of the member 1 a covering 5 of rubber or the like which is thereafter vulcanized. During the vulcanizing process the rubber would flow into the hollow threaded portion of the nut and interfere with the engagement of the threaded shank of a screw (not shown) except for the fact that I provide the nut unit with a closure plate 6 (Fig. 3). The closure plate 6 is substantially flush with the upper face of the flange 3 and closes the threaded bore to prevent the rubber from flowing into the nut and also supports the covering so that it will not sag or become perforated.

The particular nut unit selected for illustration comprises a nut member pressed from a single piece of sheet metal and having a flange 3 from which extends a hollow portion 4 threaded on its interior to engage a threaded shank of a screw. To close one end of the hollow portion 4, for purposes described above in connection with the installation, I have provided a closure plate 6 in a recess 7 in the flange 3 surrounded by a wall 8 which has been swaged from the material of the flange to provide an undercut. In other words the wall 8 has been pressed inwardly at the top so that the diameter of the recess is greater at the bottom than at the top as shown in Figs. 2 and 3. Into the recess 7 I expand the relatively thin disc or closure plate 6 which is normally dished in cross-section (Fig. 2) so that the diameter before attachment to the nut is small enough to pass through the upper end of the recess 7.

To assemble the parts of the nut unit it is merely necessary to place the plate 6 in the recess 7 (Fig. 2) so that it will rest against the shoulder 9 and then apply pressure to the disc 6 to flatten it and thereby expand it against the wall 8, as shown in Fig. 3. Thus the diameter of the closure plate 6 is increased to a tight fit against the undercut wall 8 so that it is held in place in the plane of the flange 3 and presents a surface in line with the upper face of the flange 3.

While for ordinary purposes it is merely necessary to press upon the plate 6, with sufficient force to flatten it, to assemble the nut unit parts, the attachment may be made more secure by providing a tool which will press inwardly upon the wall 8.

My improved nut unit is simple in construction, easy to assemble and is particularly useful in many installations where the threaded portion would be apt to become partially or wholly clogged without the use of the closure plate at one end. Furthermore the closure plate supports a portion of the covering material which would be unsupported by an ordinary sheet metal nut.

While I have illustrated and described a preferred embodiment of my invention I do not wish to be limited thereby, because the scope of my invention is best defined by the following claims.

I claim:

1. A nut comprising, in combination, a hollow internally threaded sleeve portion open at one end to receive a screw, a laterally extending flange at the other end of said sleeve, said flange having a recess, and a relatively thin laterally expansible plate countersunk into and laterally expanded in said recess and secured therein to close one end of the hollow sleeve against the entrance of foreign matter, and attaching means formed as an integral part of said flange for holding said plate in engagement with the flange when said plate is expanded in said recess.

2. A nut comprising, in combination, a hollow internally threaded sleeve portion open at one end to receive a screw, a laterally extending flange at the other end of said sleeve, said flange having a recess, an undercut wall surrounding said recess, and a relatively thin imperforate laterally expansible plate countersunk into and laterally expanded in said recess and secured therein by said undercut wall to close one end of the hollow sleeve against the entrance of foreign matter.

3. The combination of a nut member having a tubular internally threaded portion, and a lateral flange at one end of the tubular portion having a recess surrounded by an inwardly bent wall portion formed from said flange portion, with an imperforate disc normally dished in cross section and adapted to be flattened in said recess in the flange portion to expand the disc into interlocking engagement with said inwardly bent wall and thereby close one end of said tubular portion.

4. A nut installation comprising, in combination, an apertured supporting structure, a nut having a flange located adjacent to one face of the supporting structure and an open ended tubular internally threaded portion extending from said flange into the aperture in said supporting structure, a flexible covering material applied over the apertured support and the flange of the nut and a disc countersunk into and flush with one face of said flange, said disc and flange cooperating to support the flexible covering through the area of said flange thereby preventing entrance of the flexible material into the hollow internally threaded tubular portion and maintaining a rigid supporting surface with the supporting structure.

5. A nut installation comprising, in combination, an apertured supporting structure, a nut having a flange located adjacent to one face of the supporting structure and a tubular internally threaded portion extending into the aperture in said supporting structure, a vulcanized covering material applied to said supporting structure and covering the flange of the nut and a disc engaging directly with the vulcanized covering material and closing the flanged end of the nut to keep the covering material out of the tubular portion of the nut before vulcanizing and to support said material after vulcanizing and means formed as an integral part of the nut to secure the disc in position.

GUSTAV JOHNSON.